United States Patent [19]
Bain et al.

[11] Patent Number: 5,444,825
[45] Date of Patent: Aug. 22, 1995

[54] METHOD AND APPARATUS FOR SCALING LINE PATTERNS

[75] Inventors: Charles L. Bain, Rhinebeck; Fai Chu; Paul D. Dinicola, both of Kingston; John J. Lawless, Red Hook, all of N.Y.

[73] Assignee: International Business Machines Corporation, Armonk, N.Y.

[21] Appl. No.: 259,734

[22] Filed: Jun. 14, 1994

Related U.S. Application Data

[63] Continuation of Ser. No. 746,382, Aug. 16, 1991, abandoned.

[51] Int. Cl.$^6$ .............................................. G06F 15/40
[52] U.S. Cl. ................................................... 395/143
[58] Field of Search ............... 395/140, 141, 142, 143; 345/135, 136, 137

[56] References Cited

U.S. PATENT DOCUMENTS

| | | | |
|---|---|---|---|
| 4,677,573 | 6/1987 | Brown et al. | 364/521 |
| 5,115,479 | 5/1992 | Murayama | 382/56 |
| 5,167,015 | 11/1992 | Bair et al. | 395/143 |

FOREIGN PATENT DOCUMENTS

| | | |
|---|---|---|
| 0305034 | 3/1989 | European Pat. Off. |
| 0356114 | 2/1990 | European Pat. Off. |

OTHER PUBLICATIONS

Llewelyn et al., "Generation of Points Using Bresenham's Algorithm", IBM Technical Disclosure Bulletin (IBM TDB), Feb. 1978.

Murphy, "Line Thickening by Modification to Bresenham's Algorithm", IBM TDB, May 1978, pp. 5358–5366.

Primary Examiner—Phu K. Nguyen
Attorney, Agent, or Firm—Mark S. Walker; William A. Kinnaman, Jr

[57] ABSTRACT

In a computer graphics system, a method and apparatus for scaling a line pattern having a predetermined first number of pixels to an actual line having a predetermined second number of pixels different from said first number. The total line length is divided by the line pattern length to obtain the number of line pattern repetitions and the number of remainder pixels in the actual line per line pattern repetition. An error term is incremented by the number of remainder pixels per repetition for each pixel of a given line pattern repetition that is processed. When the cumulative error term equals the line pattern length, the error term is decremented by the line pattern length and an extra pixel is generated. For lines that are shorter than the line pattern, a similar procedure is used except that when the cumulative error term equals the line pattern length, a pixel is deleted. Lines are drawn upon the completion of pattern segments rather than as successive pixel positions are generated to increase the drawing efficiency.

9 Claims, 6 Drawing Sheets

METHOD AND APPARATUS FOR SCALING LINE PATTERNS

This is a continuation of application Ser. No. 07/746,382 filed Aug. 16, 1991 now abandoned.

BACKGROUND OF THE INVENTION

1. Field of the Invention

This invention relates to a method and apparatus for scaling a line pattern to fit an actual line and, more particularly, to a method and apparatus for use in a computer graphics system in which pixel images are generated for display by a raster scan device.

2. Background of the Invention

Applications relating to computer-aided design or computer-aided manufacturing (or CAD/CAM applications, as they usually collectively termed) must render lines in accordance with accepted conventions and standards of appearance. The ANSI Standard Y14.2M-1979 (Line Conventions and Lettering) is one such standard that defines rules for appearance and rendering of lines.

CAD/CAM applications often handle styled line types, in which lines are drawn as one or more recurring line patterns rather than as continuous lines. Lines may, for example, consist of repeating patterns of spaced dashes or of dots alternating with dashes to represent hidden lines, moved positions and the like. It is desirable to be able to render actual lines as an integral number of patterns, rather than with a portion of the pattern truncated.

Brown et al. U.S. Pat. No. 4,677,573, assigned to the owner of this application, discloses hardware for generating styled lines in a computer graphics system. While the disclosed system allows the high-speed generation of styled lines, it does not provide for scaling a line pattern to fit a particular line length.

SUMMARY OF THE INVENTION

In general, the present invention relates to a method and apparatus for scaling a line pattern having a predetermined first number of pixels to an actual line having a predetermined second number of pixels different from the first number. In accordance with the invention, the total line length is divided by the line pattern length to obtain the number of line pattern repetitions and the number of remainder pixels in the actual line per line pattern repetition. An error term is incremented by the number of remainder pixels per repetition for each pixel of a given line pattern repetition that is processed. When the cumulative error term equals the line pattern length, the error term is decremented by the line pattern length and an extra pixel is generated. For lines that are shorter than the line pattern, a similar procedure is used except that when the cumulative error term equals the line pattern length, a pixel is deleted. Lines are drawn upon the completion of pattern segments rather than as successive pixel positions are generated to increase the drawing efficiency.

DESCRIPTION OF THE PREFERRED EMBODIMENTS

Figure 1:
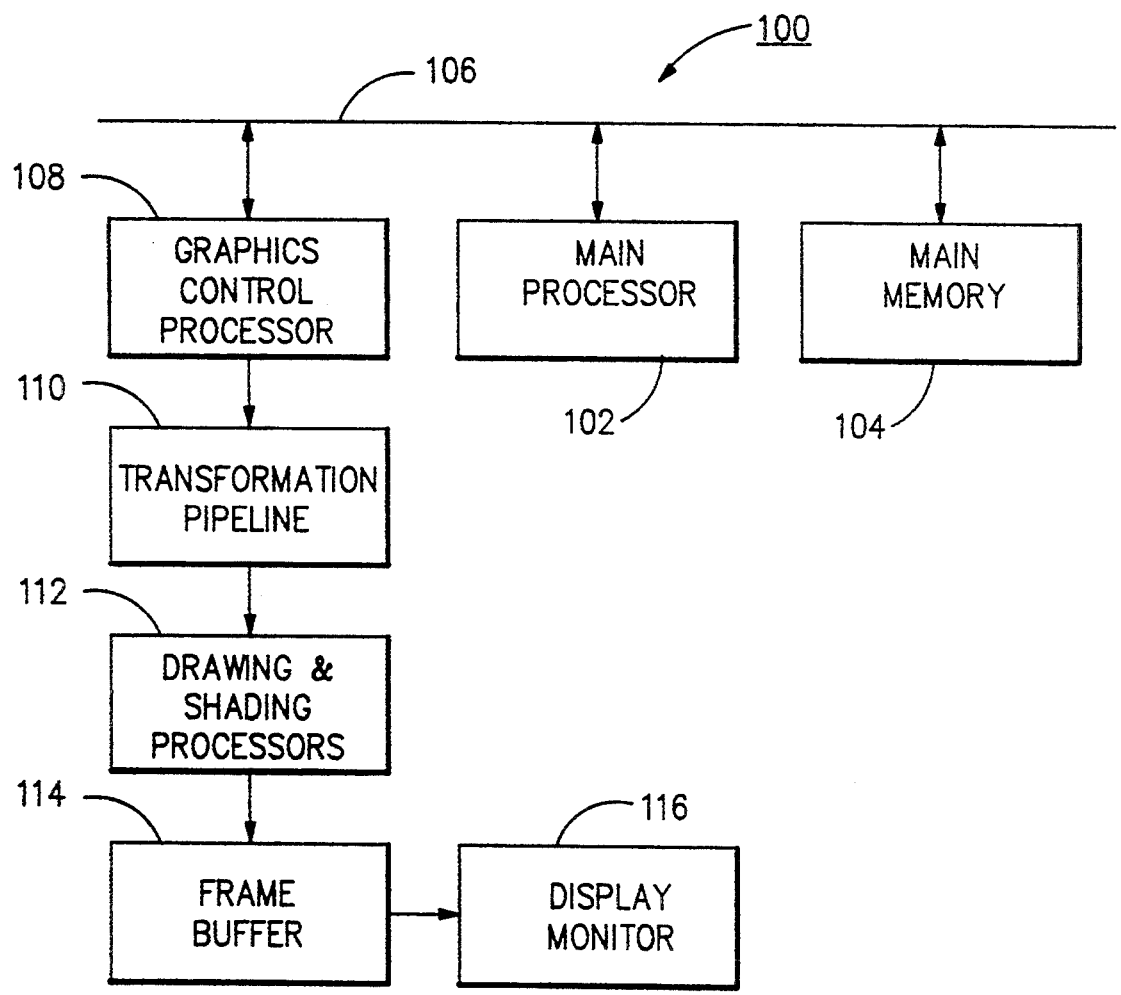
FIG. 1 is a block diagram of a computer graphics system incorporating the present invention.

FIG. 1 shows a computer graphics system 100 which may incorporate the present invention. System 100 may typically be a graphics workstation, such as an IBM RISC System/6000 computer, or a suitably configured personal computer, such as an IBM PS/2 computer, running a graphics application (e.g., CAD/CAM) calling for styled lines. ("IBM", "RISC System/6000" and "PS/2" are trademarks of IBM Corporation.)

As shown in FIG. 1, in system 100 a main processor 102 is coupled to a main memory 104 and a graphics control processor (GCP) 108 by means of a bus 106. Main memory 104 stores a display list of graphics orders representing graphics primitives (lines, circles, other curves, text, etc.) denoting objects to be displayed. In addition to coordinate information, the graphics orders contain information specifying various attributes (color, line style, etc.) of the graphics primitives. Main processor 102 causes these orders to be transferred to graphics control processor 108 for execution by a pipeline 110 of transformation processors (TrP) downstream from control processor 108.

Transformation processors 110 operate in a conventional manner to transform the primitives from modeling coordinates to device-independent world coordinates, clip to a viewing volume representing the portion of the world coordinate space to be displayed, and map from the world coordinates to device coordinates specific to the device (monitor, printer, etc.) used for display. At the bottom of the transformation pipeline 110, drawing and shading processors 112 rasterize the transformed, clipped and mapped coordinates by converting them to actual pixel values that are stored in a frame buffer 114.

Frame buffer 114 stores a value for each pixel of a two-dimensional array of pixels that are displayed by a display monitor 116. (As noted above, in general other display devices, including printers, may also be used.) In a typical graphics system, the display resolution may be 1280 horizontal pixels by 1024 vertical pixels. Individual pixels are identified by integer screen coordinates (X, Y), where X may vary between 0 and 1279 and Y may vary between 0 and 1023.

Figure 2:
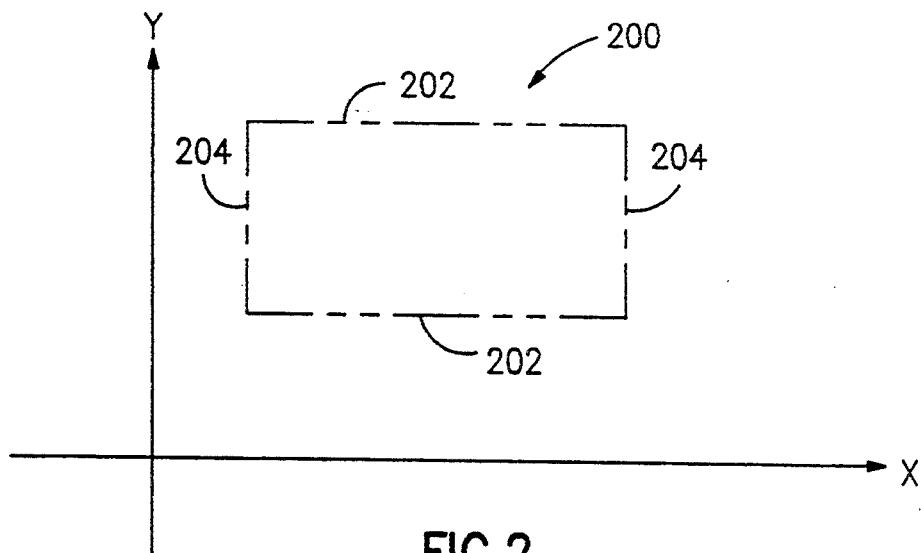
FIG. 2 shows a styled polyline containing an integral number of line pattern repetitions.

FIG. 2 shows a styled line as it might be ideally represented by display 116 (ignoring, for the moment, the granularities inherent in the rasterization process). As shown in the figure, a rectangle 200 consists of a pair of horizontal sides 202 and vertical sides 204. In a typical application, rectangle 200 might be drawn to contain 6 repetitions of a common line pattern (to be described further below) containing two long dashes separated by spaces and a single short dash.

In the particular example shown in FIG. 2, each horizontal side 202 contains exactly two line pattern repetitions, while each vertical side 204 contains a single line pattern repetition. In general, however, the pattern is scaled to fit the polyline as a whole rather than the constituent line segments. (A polyline is a series of line segments connecting successive pairs of vertices.) However, a line pattern could be scaled to fit an individual segment by defining that segment as the polyline.

Figure 3:
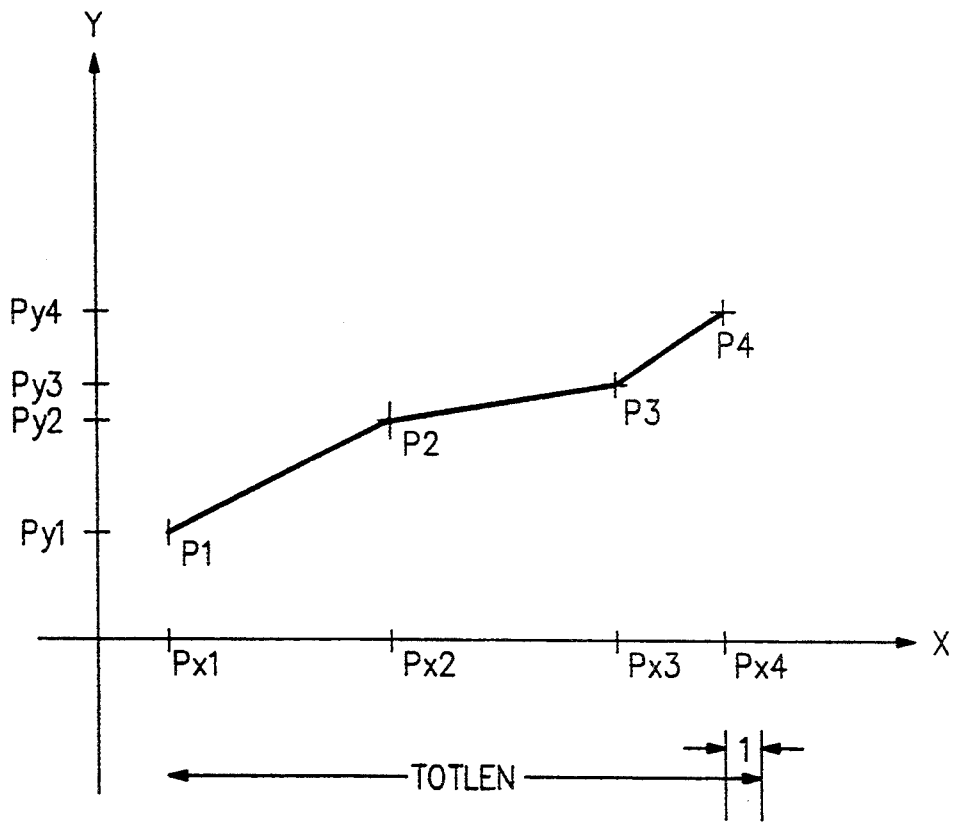
FIG. 3 shows a polyline to which a line pattern may be scaled to fit.

FIG. 3 shows an ideal polyline P to which a line pattern may be scaled to fit. Polyline P consists of a plurality of points or vertices P1–P4 connected by line segments P1P2, P2P3, P3P4. Points P1–P4 have respective X-coordinates Px1–Px4 and Y-coordinates Py1–Py4. Since we are considering the polyline P as it is represented at the bottom of the transformation pipeline 110 (FIG. 1), the coordinates Pxi and Pyi are the screen coordinates referred to above.

Figure 4:
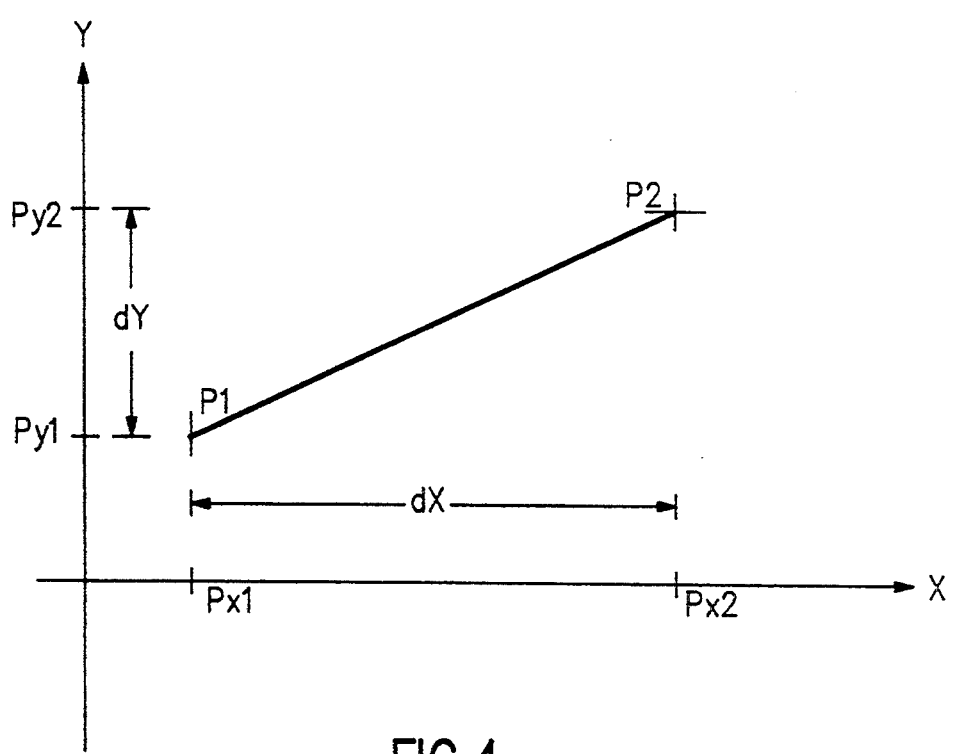
FIG. 4 shows the first line segment of the polyline shown in FIG. 3.

Referring to FIG. 4, which shows line segment P1P2, each segment of polyline P (FIG. 3) has an X-axis increment dX and a Y-axis increment dY between its endpoints. In the particular case of line segment P1P2:

$$dX = Px2 - Px1$$

$$dY = Py2 - Py1.$$

The larger of these increments is termed the major axis increment; the smaller is termed the minor axis increment.

Figure 7:
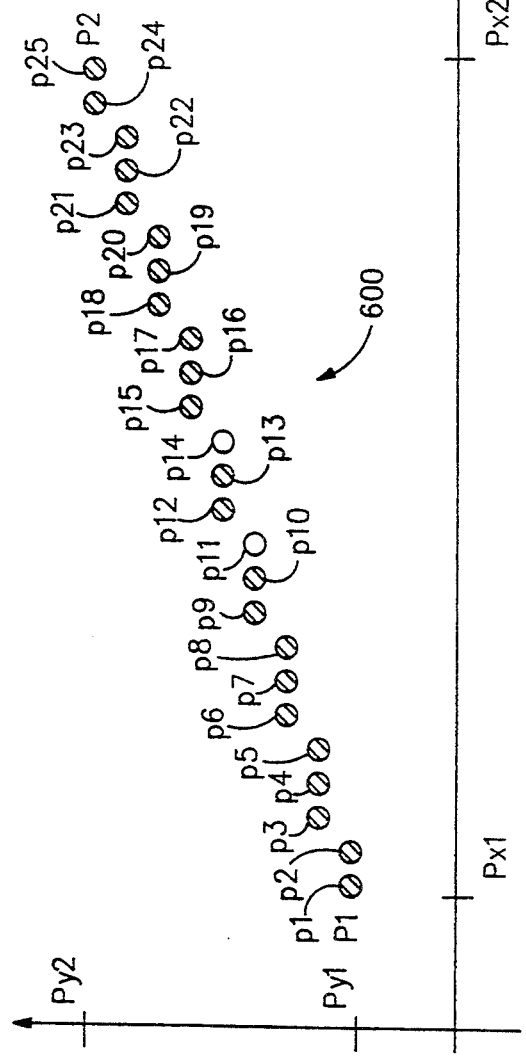
FIG. 7 shows the actual pixel positions of the line segment shown in FIG. 6.

In a manner that is well known in the art, each segment of polyline P is rendered by converting it to a series of pixels approximating the ideal line. As a particular example, FIG. 7 shows a series of pixels p1–p25 approximating line segment P1P2. These pixels are generated incrementally, moving either diagonally or along the major axis of the line segment on each iteration. A commonly used procedure for generating pixel positions in this incremental manner is the so-called Bresenham algorithm, described in J. D. Foley et al., *Computer Graphics: Principles and Practice* (2d ed. 1990), incorporated herein by reference, at pages 74–80.

Line pattern pixels are scaled to match the number of actual line pixels. The length of polyline P for the purpose of scaling a line pattern is thus its total pixel length. Since polyline P is drawn along the major axes of its segments, its total pixel length TOTLEN (FIG. 3) is the sum of the major axis increments between the initial pixel and the final pixel of the polyline, plus one additional pixel since the line includes both the initial and final pixels.

In the example shown in FIG. 3, all of the line segments P1P2, P2P3, P3P4 have the X-axis as their major axis. Accordingly:

$$TOTLEN = (Px4 - Px1) + 1.$$

In general, as already noted, the contribution of each line segment is determined along its major axis.

Although for the sake of simplicity the polyline P shown in FIG. 3 is shown as an open polyline, polylines may more typically be closed, as in the case of the rectangle 200 shown in FIG. 2. Also, as already noted, a polyline may consist of only a single segment.

Figure 5:
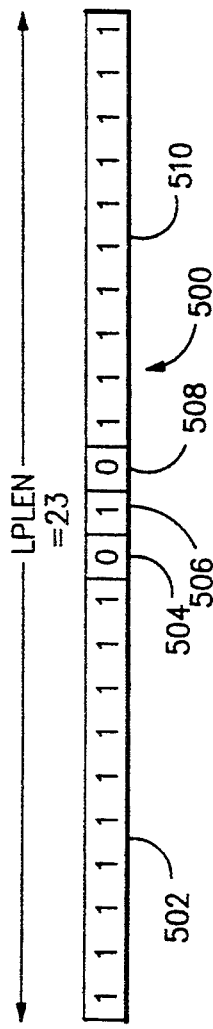
FIG. 5 shows a line pattern that is scaled to fit an actual line in accordance with the present invention.
Figure 6:
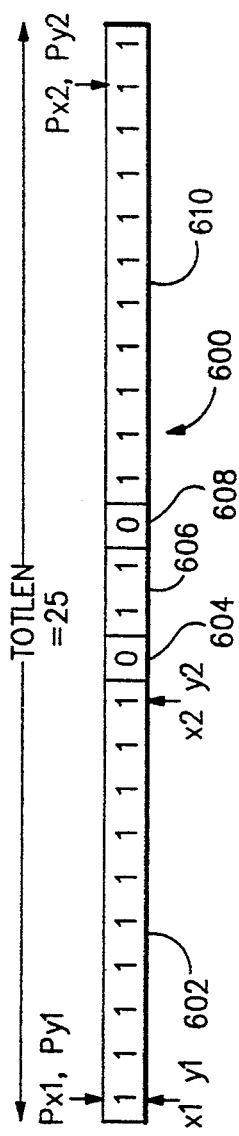
FIG. 6 shows the pixel values of a line segment that has been drawn in accordance with the line pattern shown in FIG. 5.

With this general background, an example of scaling a line pattern to fit an actual line will be illustrated with reference to FIGS. 5 to 7.

The "phantom" line-rendering style is a line-space-dash-space-line pattern where the line must start and end with a half-length line. To achieve this, the line pattern can be set to the pattern 500 shown in FIG. 5, in which each 0 indicates a pixel that is "off", while each 1 indicates a pixel that is "on". The line pattern 500 has a total pattern length LPLEN of 23 pixels and consists of six segments 502–512, the last of which is of zero length and hence not shown in the figure. The last pattern segment 512 is defined, even though it does not contribute as such to the pattern 500, since it permits multiple repetitions of the pattern to be handled as a series of alternating "on" and "off" segments (some of which are of zero length).

The various segments 502–512 of line pattern 500 may also be indicated tabularly, as shown below:

TABLE 1

| Segment | Length | Value |
|---------|--------|-------|
| 502 | 10 | On |
| 504 | 1 | Off |
| 506 | 1 | On |
| 508 | 1 | Off |
| 510 | 10 | On |
| 512 | 0 | Off |

Assume that line pattern 500 is scaled to fit an actual line 600 (FIGS. 6 and 7) having endpoints P1 and P2 and a total length TOTLEN of 25 pixels. FIG. 6 shows the pixel values of the line 600 along the major axis, calculated in accordance with the invention as described below, while FIG. 7 shows the actual positions of the pixels p1–p25 along the X- and Y-axes.

The division of TOTLEN by LPLEN yields one complete line repetition (LPREP), with 2 remaining pixels (REMPXL). To scale pattern 500 to fit line 600, a pixel addition factor (PAF) of 2 is added to a pixel addition factor sum (PAFSUM) for each pixel of the line pattern that is rendered. Pixel rendering is accomplished through the use of a suitable incremental algorithm, such as the Bresenham algorithm, which generates pixels along an arbitrarily oriented line. When PAFSUM is equal to or greater than LPLEN, an additional pixel is rendered in the current ON/OFF state of the pattern, and LPLEN is subtracted from PAFSUM.

Stepping though this process for generating line 600 from pattern 500, after the first 10-pixel ON pattern segment 502 is drawn, PAFSUM has been incremented to 20. After the next one-pixel OFF pattern segment 504, PAFSUM has been incremented to 22. After the next one-pixel ON pattern segment 506, PAFSUM has been further incremented by 2, to 24. Since PAFSUM is now greater than LPLEN, an additional pixel is rendered in the current ON/OFF state of the pattern 500. This expands the center line segment 606 of line 600 to 2 ON pixels. PAFSUM is decremented by LPLEN to 1.

The next pattern segment 508 is not drawn, since it is OFF. At the end of the segment 508, PAFSUM has been incremented by 2 to 3. At the end of the next ON pattern segment 510, which is 10 pixels, PAFSUM has been incremented to 23. Since PAFSUM is now equal to LPLEN, an additional ON pixel is rendered. The last segment 610 of line 600 is thus expanded to 11 ON pixels.

Table 2 indicates the makeup of the line segment 600 to which line pattern 500 has been scaled:

TABLE 2

| Pattern Segment | Length | Value | Pixels |
| --- | --- | --- | --- |
| 602 | 10 | On | p1-p10 |
| 604 | 1 | Off | p11 |
| 606 | 2 | On | p12-p13 |
| 608 | 1 | Off | p14 |
| 610 | 11 | On | p15-p25 |

If the actual line 600 had been shorter than the pattern segment 500 (e.g., 20 pixels rather than 25), the line pattern would have been shrunk rather than stretched. To shrink pattern segment 500, PAFSUM would be incremented by PAF=REMPXL (3 in this case) as before. However, when PAFSUM reached LPLEN, a pixel would be deleted from the current segment of line 600 instead of being added. In general, if the pixel addition factor PAF is less than or equal to half the line pattern length LPLEN, the pattern is stretched to fit the actual line. If, on the other hand, the pixel addition factor PAF is greater than half the line pattern length LPLEN, the pattern is shrunk to fit the actual line.

The procedure for multiple repetitions of the line pattern 500 is similar to that described above except that PAF is set equal to REMPXL/LPREP, where LPREP is the number of complete line pattern repetitions. Conceptually, for each pixel of the line pattern 500 that is rendered on a given repetition, PAF/LPREP is added to or subtracted from the number of pixels in the line 600.

Diagonal lines 600 are handled through conventional iteration of a Bresenham or similar line-drawing algorithm for each pixel rendered, keeping track of the error term PAFSUM (in addition to the usual Bresenham error term that determines the location of the next pixel) on a pixel-by-pixel basis until the total line has been completed.

Figure 8:
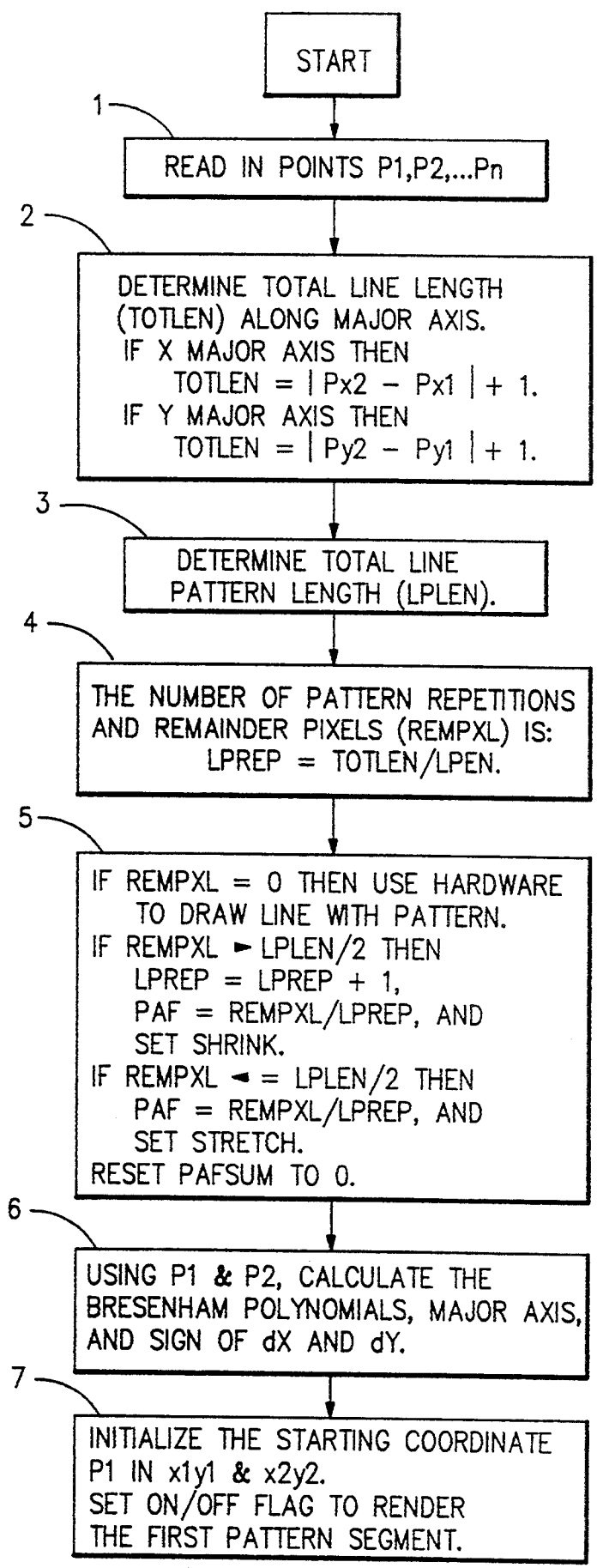
FIGS. 8 and 9 are flowcharts of the steps performed to scale a line pattern to an actual line in accordance with the present invention.
Figure 9:
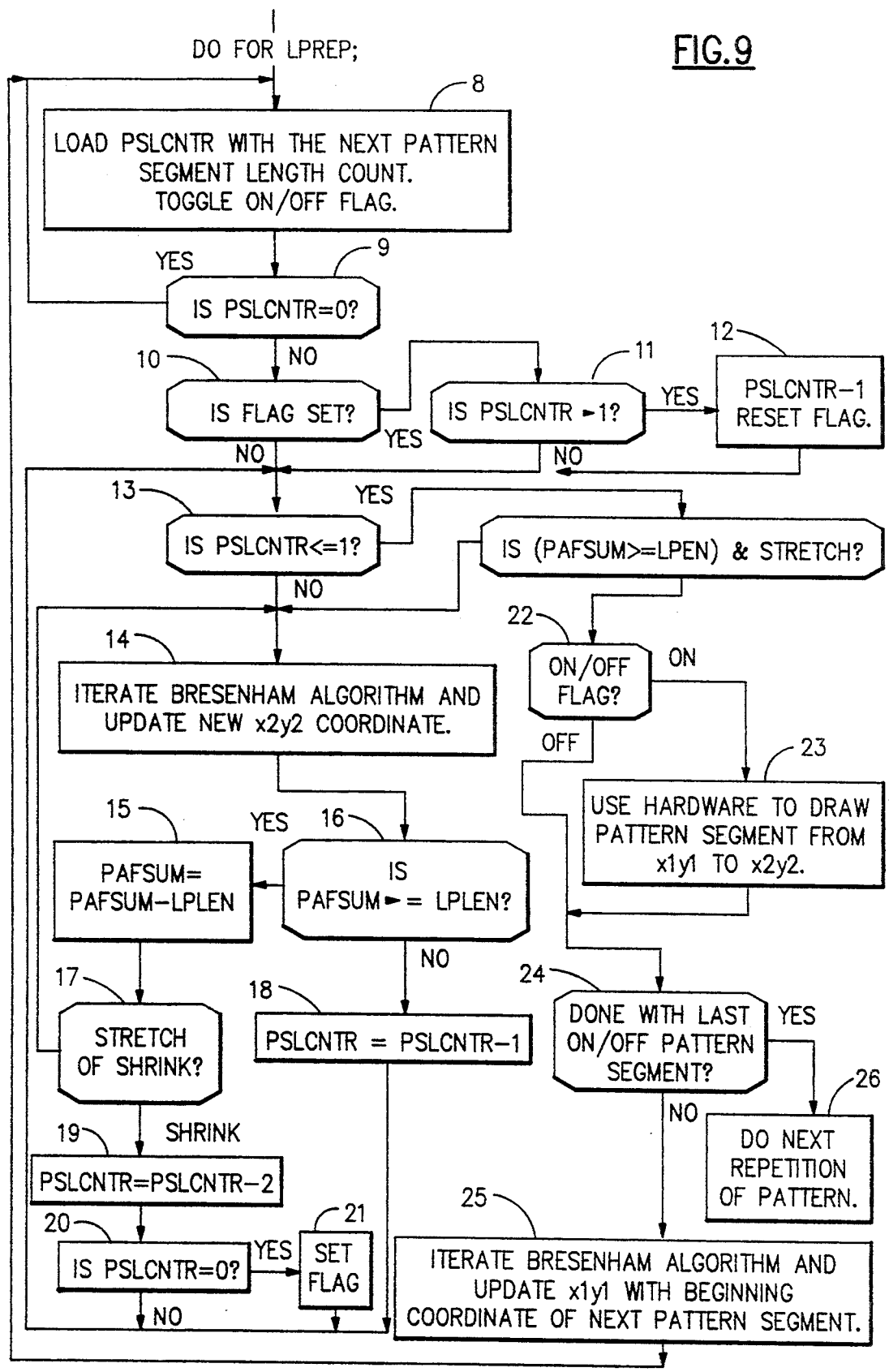

FIGS. 8 and 9 show in greater detail the steps performed to scale a line pattern to fit a actual line. These steps are performed by a program running within the drawing and shading processors 112 of system 100 (FIG. 1), using suitable registers or memory locations (not separately shown) to store the various control variables.

Referring to FIG. 8, the program first reads in the points P1-Pn making up the line from the transformation pipeline 110 (FIG. 1) (step 1). In the discussion that follows, it will be assumed initially that line consists of a single line segment with endpoints P1 and P2 (i.e., n=2). The program then determines the total length (TOTLEN) of the line along the major axis of each segment making up the line (step 2).

The program then determines the total line pattern length LPLEN (step 3), and determines the number of pattern repetitions LPREP and remainder pixels REMPXL in accordance with the equations (step 4):

*LPREP=TOTLEN/LPLEN*

*REMPXL=TOTLEN mod LPLEN.*

If REMPXL is 0, then the program uses the hardware in the drawing and shading processors 112 (FIG. 1) to draw the line with the pattern; this significantly increases the processing speed in this special case, since the iterative scaling steps (to be described below) are avoided. Otherwise, the program compares REMPXL with LPLEN/2 (step 5). If REMPXL is greater than LPLEN/2, then LPREP is incremented by 1, PAF is set equal to (LPLEN−REMPXL)/LPREP, and the SHRINK flag is set. Otherwise, PAF is set equal to REMPXL/LPREP and the STRETCH flag is set. PAFSUM is then initially set to 0.

The program then performs initial processing for the current line segment, in this case the line segment P1P2. Using the line segment endpoints P1 and P2, the program calculates the Bresenham parameters, as well as bits indicating the major axis and the signs of dX and dY (step 6). These quantities are used in the execution of Bresenham algorithm referred to above. The program then initially sets the starting and ending pattern segment coordinates x1, y1 and x2, y2 (indicated for simplicity below in the concatenated form x1y1, x2y2) equal to the coordinates Px1, Py1 of the starting point P1 of line segment P1P2; the program also sets an ON/OFF flag to OFF to render the first pattern segment (step 7).

FIG. 9 shows the steps performed for each repetition of the line pattern being drawn. The program first loads a pattern segment length counter PSLCNTR with the next pattern segment length count, and toggles the ON/OFF flag (step 8). If the pattern segment has a length of 0, then step 8 is immediately repeated for the next segment, since zero-length segments do not contribute to the line (step 9).

The program then checks to see whether a FLAG bit has been set (step 10). If FLAG is set, and the pattern segment length count PSLCNTR is greater than 1 (step 11), the pattern segment length count PSLCNTR is decremented and FLAG reset (step 12). A set FLAG indicates that the previous pattern segment should have been shrunk by one pixel using the PAFSUM criterion, but was not since it consisted of only one pixel in the first place and thus would have been eliminated from the pattern. The current pattern segment length is therefore decremented by one pixel to generate the correct number of pixels for the polyline as a whole.

Thereafter, the program increments PAFSUM by PAF and checks the pattern segment length count PSLCNTR (step 13). If PSLCNTR is 2 or more, the program enters a loop containing process steps 14-21. On each iteration of this loop, the program generates an updated value of the final pattern segment coordinates x2y2 in accordance with the Bresenham algorithm (step 14). Thereafter, on each iteration, the pattern segment length count PSLCNTR is decremented by 1 (step 18).

On each iteration of the loop, the cumulative error term PAFSUM is compared with the line pattern length LPLEN (step 16). When PAFSUM is incremented to a point at which it equals or exceeds LPLEN, the program branches from the portion of the loop containing step 18. After branching, the program decrements PAFSUM by LPLEN (step 15) and examines the STRETCH and SHRINK flags (step 17).

If the SHRINK flag is set, the program decrements the pattern segment length count PSLCNTR by 2 (step 19), instead of by one as it normally would have at step 18, so that one less pixel coordinate is generated. PAFSUM is also incremented by PAF at this time, since the incrementing of PAFSUM should track the decrementing of PSLCNTR. The program the checks to see whether the count has been decremented to 0 (step 20) and, if so, sets FLAG (step 21). The program thereafter returns to step 13 for another iteration.

As noted above, FLAG is set because a one-pixel line pattern segment is always drawn, even if the error term PAFSUM indicates that a pixel should be deleted from the pattern. FLAG is used in the manner described above to decrement PSLCNTR an extra time (step 12) at the beginning of a subsequent pattern segment.

If at step 17 the STRETCH flag is set, the program returns to step 14 for one or more further iterations of the loop. Since the branching operation bypasses the step in which the pattern segment length count is decremented (step 18), the net effect is that an extra pair of pixel coordinates x2y2 are generated (step 14) for a given pattern segment length count. REMPXL such extra pixels are generated in the course of the program execution, providing the desired result of stretching the line pattern to fit the actual line.

When the pattern segment length count PSLCNTR has been decremented to 1 or less, or if the count was 1 when originally loaded (step 13), the program checks to see whether PAFSUM is equal to or greater than LPLEN and the STRETCH flag has been set. If both of these conditions are met, the program branches back to step 14 for another iteration, since an extra pixel should be generated at this time. Otherwise, the program branches to step 22 rather than step 14.

Upon branching to step 22, the program checks the ON/OFF flag (step 22) and, if the flag is set ON, draws the pattern segment between the pixel positions x1y1 and x2y2 (step 23). Deferring the actual writing of pixels to the frame buffer 114 (FIG. 1) until the final coordinates x2y2 for the line pattern segment have been determined results in a material speed increase over the alternative of writing to the frame buffer as each pixel position is generated.

If the pattern segment just processed was the last segment of the current pattern repetition (step 24), the program goes on to the next pattern repetition (or terminates if there are no more pattern repetitions) (step 26). Otherwise, the program performs another iteration of the Bresenham algorithm to determine the initial coordinates x1y1 of the next pattern segment; the final coordinates x2y2 of the next pattern segment are also initially set equal to x1y1 (step 25).

Figure 10:
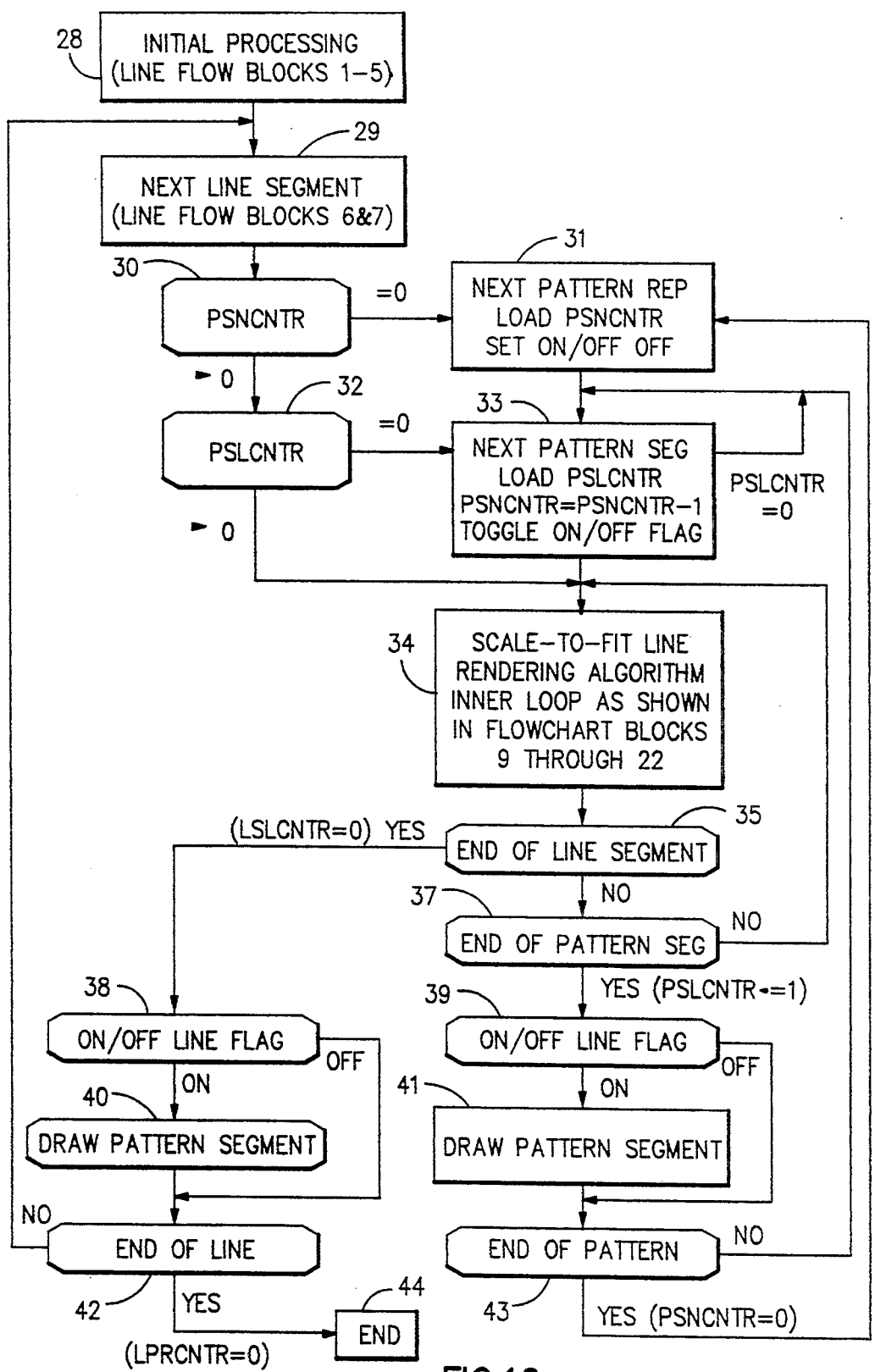
FIG. 10 is a flowchart of the processing of a polyline containing a plurality of line segments.

FIG. 10 is a high-level flowchart of the processing of a polyline such as polyline P (FIG. 3) containing multiple line segments. As shown in FIG. 10, the program first completes the initial processing steps 1–5 of FIG. 8 performed for the polyline P as a whole (step 28 of FIG. 10). As part of this initial processing, the program initializes a line pattern repetition count LPRCNTR at LPREP.

The program then proceeds to the initial processing steps 6–7 of FIG. 8 for the current line segment (step 29). As part of this initial processing for the current line segment, the program initializes a line segment length count LSLCNTR at the length of the current segment. LSLCNTR is decremented as each pixel position is generated along the line segment.

If this is the first pattern repetition, or if there are no remaining segments of the current pattern repetition, as indicated by a pattern segment number count PSNCNTR of 0 (step 30), the program proceeds to the next pattern repetition, which is initiated by loading the pattern segment number counter PSNCNTR with the number of segments in the pattern, decrementing the line pattern repetition count LPRCNTR, and setting the ON/OFF flag to OFF (step 31).

If this is the first pattern segment, or if there are no remaining pixels of the current pattern segment, as indicated by a pattern segment length count PSLCNTR of 0 (step 32), the program proceeds to the next pattern segment, which is initiated by loading the pattern segment length counter PSLCNTR with number of pixels in the pattern segment, decrementing the pattern segment number count PSNCNTR, and toggling the ON/OFF flag (step 33). If the pattern segment has a length of 0, then step 33 is immediately repeated for the next segment, since zero-length segments do not contribute to the line.

The program then iteratively executes the loop containing steps 34, 35 and 37. On each pass through the loop, the program updates the coordinates of the final segment pixel x2y2 in accordance with Bresenham's algorithm, as shown in FIG. 9, modifying the number of pixels to be drawn in accordance with the cumulative error term PAFSUM (steps 9–22); however, no pixels are actually drawn at this point in the sense of being written to the frame buffer 114 (FIG. 1).

When the program reaches the end of a pattern segment, as indicated by a pattern segment length count PSLCNTR of 1 or less (step 37), the program checks the ON/OFF flag (step 39) and, if the flag is set ON, draws the pattern segment between the pixel positions x1y1 and x2y2 (step 41). Thereafter, unless it has reached the end of a pattern repetition (step 43), the program returns to step 33 for the next pattern segment.

If at the end of a pattern segment the program has also reached the end of a pattern repetition, as indicated by a pattern segment number count PSNCNTR of 0 (step 43), the program returns to step 31 for the next pattern repetition.

Upon reaching the end of the current line segment, as indicated by a line segment length count LSLCNTR of 0 (step 35), the program exits the loop containing step 34. The program then checks the ON/OFF flag (step 38) and, if the flag is set ON, draws the pattern segment (or the portion of it contained within the line segment) between the pixel positions x1y1 and x2y2 (step 40).

Upon the completion of steps 38 and 40, if the program has not reached the end of the polyline P, it returns to step 29 for the initial processing steps for the next line segment. If at the completion of steps 38 and 40 the program has reached the end of the polyline P, as indicated by a line pattern repetition count LPRCNTR of 0 (step 42), it terminates (step 44), since all of the pixels making up the styled polyline have been drawn.

In the procedure shown in FIGS. 8 and 9, PAFSUM is incremented by PAF=REMPXL/LPREP and is compared with LPLEN. As thus defined, PAF may have a fractional value if the number of pattern repetitions LPREP is greater than one. This may be avoided if desired by defining PAF instead as REMPXL and comparing PAFSUM with and decrementing it by LPREP*LPLEN, in effect multiplying all relevant quantities by LPREP to obtain integral values.

The iterative incrementing of PAFSUM and comparison with LPLEN adds some overhead to the conventional (nonstyled) Bresenham algorithm, which is often implemented with hardware assists. Similar hardware assists may be used if desired to decrease the time required to perform the PAFSUM operations.

Although the invention has been described above with particular reference to rectilinear line segments, it may also be used to draw curvilinear segments such as circular or elliptical arcs, since incremental procedures also exist for drawing such curvilinear segments as described in the above-identified reference of J. D. Foley et al. at pages 81–91.

What is claimed is:

1. A method of applying a line pattern having a predetermined first number of pixels each having a pattern pixel value to an actual line having a second number of pixels as the actual line is drawn in a graphics system having a processor and a memory, the method comprising the steps of:

determining a line pattern error threshold based on a ratio of said second number of pixels to said first number of pixels said line error being distinct from an actual line drawing error threshold;

sequentially generating pixel positions for said actual line and modifying a line pattern error term;

for each generated actual line pixel position applying a next pattern pixel value from said line pattern and incrementing a line pattern error term;

determining a next pattern pixel value to apply as the next sequential pattern pixel value from said line pattern unless said line pattern error term exceeds said error threshold;

assigning a modified next pattern pixel value if said line pattern error term exceeds said error threshold and resetting said error term.

2. The method of claim 1, wherein the step of assigning a modified next pattern pixel value comprises the step of:

repeating assignment of a pattern pixel value to said next pattern pixel value such that an extra pattern pixel is added to said actual line.

3. The method of claim 1, wherein the step of assigning a modified next pattern pixel value comprises the step of:

skipping assignment of a next pattern pixel value from said line pattern and assigning the next subsequent pattern pixel value to said next pattern pixel value such that one less pattern pixel is added to said actual line.

4. The method of claim 1, wherein the step of determining an error threshold includes the steps of:

determining the number of full line patterns that can be drawn in said actual line and determining a remaining number of pixels in said actual line;

setting said error threshold to said full line pattern length;

setting an error adjustment term to be the remaining number of pixels divided by the first number of pixels;

incrementing said line pattern error term by said error adjustment term whenever a pixel is drawn in said actual line.

5. The method of claim 4 further comprising the step of:

setting a line adjustment to "shrink" if said remaining number of pixels is greater than one half the first number of pixels in said line pattern;

setting said line adjustment to "stretch" otherwise.

6. The method of claim 5, further comprising the steps of:

assigning a modified next pattern pixel by:

repeating assignment of a pattern pixel value to said next pattern pixel value such that an extra pattern pixel is added to said actual line, if said line adjustment is "stretch"; or skipping assignment of a next pattern pixel value from said line pattern and assigning the next subsequent pattern pixel value to said next pattern pixel value such that one less pattern pixel is added to said actual line, if said line adjustment is "shrink."

7. A system for applying a line pattern having a first pixel length to an actual line being drawn in a graphics system, said actual line having a second pixel length different than said first pixel length, the graphics system having a processor and memory, the system comprising:

means for determining a number of full line patterns in said second pixel length and for determining a number of remainder pixels by which said second pixel length exceeds an even multiple of said first pixel length;

means for repeatedly determining a next pixel position for each pixel of said actual line and adjusting an actual line error term;

means for determining a pattern to apply at said next pixel position, said pattern determined from said line pattern;

means for adjusting said pattern to apply to said next pixel such that said line pattern first pixel length is scaled to fit said actual line; and means for applying said pattern to said next pixel position by storing said pattern in said memory.

8. The system of claim 7, wherein said means for adjusting comprises:

means for incrementing a line pattern error term by an error adjustment factor for each pattern applied to said next pixel;

means for testing said line pattern error term against said line pattern length;

means for modifying the next pixel pattern to apply if said line pattern error term exceeds said line pattern length;

means for subtracting said line pattern error term from said line pattern length if said line pattern error term exceeds said line pattern length.

9. The system of claim 8, wherein said means for modifying comprises:

means for determining whether to shrink or stretch said pattern, said pattern being shrunk if said remainder pixels exceed one half of said line pattern length, and said pattern being stretched otherwise; and causing a repetition of a previous pattern pixel if said pattern is to be stretched, or causing a pattern pixel to be passed over if said pattern is to be shrunk.

* * * * *